US007627476B2

(12) United States Patent
Nanavati et al.

(10) Patent No.: US 7,627,476 B2
(45) Date of Patent: Dec. 1, 2009

(54) CALL FLOW MODIFICATION BASED ON USER SITUATION

(75) Inventors: Amit A. Nanavati, New Delhi (IN); Nitendra Rajput, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 11/303,431

(22) Filed: Dec. 16, 2005

(65) Prior Publication Data

US 2007/0140183 A1 Jun. 21, 2007

(51) Int. Cl.
*G10L 11/00* (2006.01)

(52) U.S. Cl. .................... 704/270.1; 704/270
(58) Field of Classification Search ............ 379/201.01; 704/270.1, 270, 251
See application file for complete search history.

(56) References Cited

U.S. PATENT DOCUMENTS

| 6,850,603 | B1 | 2/2005 | Eberle et al. | |
|---|---|---|---|---|
| 6,885,734 | B1 | 4/2005 | Eberle et al. | |
| 7,206,391 | B2* | 4/2007 | Chiu et al. | 379/88.25 |
| 2003/0194065 | A1 | 10/2003 | Langseth et al. | |
| 2004/0202293 | A1 | 10/2004 | Pugliese | |
| 2004/0217986 | A1 | 11/2004 | Hambleton et al. | |
| 2004/0247092 | A1 | 12/2004 | Timmins et al. | |
| 2005/0094798 | A1 | 5/2005 | Yacoub | |
| 2005/0135338 | A1* | 6/2005 | Chiu et al. | 370/352 |
| 2006/0165104 | A1* | 7/2006 | Kaye | 370/401 |

FOREIGN PATENT DOCUMENTS

JP 2002051211 2/2002

OTHER PUBLICATIONS

Cohen et al., "Building context-aware applications with context weaver," IBM Research Report RC23388, Oct. 22, 2004.

* cited by examiner

*Primary Examiner*—Creighton Smith
(74) *Attorney, Agent, or Firm*—Gibb I.P. Law Firm, LLC

(57) ABSTRACT

The call flow of a user is modified based on the user's situation. A set of context-specific information regarding a user is collected, without prompting the user for this context-specific information within a call with the user. For instance, the context-specific information can include locational information regarding the user, weather information at the current location of the user, traffic information at the user's current location, proximity information of the user to a given transportation mode (airport, train station, and so on), as well as user preferences information. The situation of the user is determined based on the set of context-specific information collected, and the call flow of voice prompts to the user within the call is modified based on the situation determined.

20 Claims, 4 Drawing Sheets

CALL FLOW MODIFICATION BASED ON USER SITUATION

FIELD OF THE INVENTION

The present invention relates generally to interactive voice response (IVR) systems and other types of systems in which there are call flows of voice prompts to users within calls with the systems, and more particularly to modifying such call flows based on the situations of the users.

BACKGROUND OF THE INVENTION

In interaction voice response (IVR) system is an automated telephone information system that speaks to the caller with a combination of fixed voice menus and realtime data from databases. The caller responds by pressing digits on the telephone or speaking words or short phrases. Applications include bank-by-phone, flight-scheduling information and automated order entry and tracking.

IVR systems allow callers to get needed information 24 hours a day. They are also used as a front end to call centers in order to offload as many calls as possible to costly human agents. In such cases, IVR systems do not replace the agent, but help to eliminate the need for them to constantly answer simple, repetitive questions.

A disadvantage of such IVR systems is that their call flows are relatively predetermined. A call flow is the sequence of voice prompts to the user within a call to an IVR system. Within the prior art, the call flow is modified only on the basis of the user's response to a given voice prompt. That is, a call flow can be programmed in which there are conditional voice prompts, based on the answers provided by users to other voice prompts. Otherwise, however, call flows are preordained, and not modifiable.

For this and other reasons, there is a need for the present invention.

SUMMARY OF THE INVENTION

The present invention relates to modifying the call flow of a user based on the user's situation. A method of one embodiment of the invention collects a set of context-specific information regarding a user who initiates a call to a system or with whom the system has initiated the call, without prompting the user for this context-specific information within the call. For instance, the context-specific information can include, but is not limited to, locational information regarding the user, weather information at the current location of the user, traffic information at the user's current location, proximity information of the user to a given transportation mode (airport, train station, and so on), as well as user preferences information. The context of a user can further include, but is not restricted to, personalization settings, of the user, the user's physical location, the current time at the user's location, a history of the user's behavior, financial market changes (such as new offerings, deals, and so on), current stock prices, and changes in the user's environment. Changes in the user's environment of the user may include changes in stock quotes, where relevant, changes in relevant new stock offering, as well as any other change in the user's environment that can- act as a stimulus in the domain of a conversational system to which to react or adjust. The context of a user can further include, but is not limited to, the state of the user based on the user's location (such as whether the user is in a meeting or in a given lounge), as well as the mood of the user (such as relaxed, tense, and so on). The method determines the situation of the user based on the set of context-specific information collected, and modifies the call flow of voice prompts to the user within the call based on the situation determined.

In one embodiment, the situation is a single situation selected from a set of possible situations, where the situation is descriptive of the set of context-specific information as a whole. In another embodiment, the situation is a set of situational events corresponding to the set of context-specific information. In this latter embodiment, a set of dialog snippets for the call flow may be generated that correspond to the set of situational events. The order in which the dialog snippets are presented to the user may be determined, and/or conditions regarding the presentation of each dialog snippet may be determined based on context-sensitive logic stored in a rule base.

A system of one embodiment of the invention includes a context-gathering component, a situation-generating component, and a call flow-modifying component. The context-gathering component collects a set of context-specific information regarding a user who initiates a call to a system or with whom the system has initiated the call, without prompting the user within the call. The situation-generating component determines a situation of the user as a single situation from a set of possible situations, based on the set of context-specific information, such that the situation is descriptive of the set of context-specific information as a whole. The call flow-modifying component generates a number of voice markup language pages based on the situation of the user, where these pages encapsulate a call flow of voice prompts to the user within the call. The call flow is thus modified based on the situation of the user as has been determined.

A system of another embodiment of the invention also includes a context-gathering component, a situation-generating component, and a call flow-modifying component, and further includes a voice markup language page-generating mechanism. The context-gathering component again collects a set of context-specific information regarding a user who initiates a call to a system or with whom the system has initiated the call, without prompting the user within the call. The situation-generating component determines a situation of the user as a set of situational events corresponding to the set of context-specific information. The call flow-modifying component generates a set of dialog snippets for a call flow of voice prompts to the user within the call, and determines an order in which the dialog snippets are presented to the user within the call flow and/or conditions regarding presentation of each dialog snippet based on context-sensitive logic. The voice markup language page-generating mechanism generates a voice markup language page for each dialog snippet to be presented to the user. The call flow is thus again modified based on the situation of the user as has been determined.

Embodiments of the invention provide for advantages over the prior art. Unlike conventional systems, in which call flows are preordained with minimal capability to be modified, call flows within the inventive systems are modifiable based on the situations of the user. The situation of the user may be defined as the combination of circumstances of the user at a current moment in time. The situation of the user is determined based on context-specific information of the user at this current moment in time.

For example, the user may be calling to find the status of his or her flight. If the system is aware that the user is calling from the airport, has a current flight scheduled, and so on, it can modify the call flow to the user without asking the user for such contextual information. As a result, the user is not prompted for information within the call flow that is instead gleaned from other sources. Furthermore, the system may be aware that the user is calling a short time before his or her flight is scheduled to depart. As a result, the call flow may be modified to provide the user with information in a very quick manner, since it can be gleaned that the user does not have much time.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
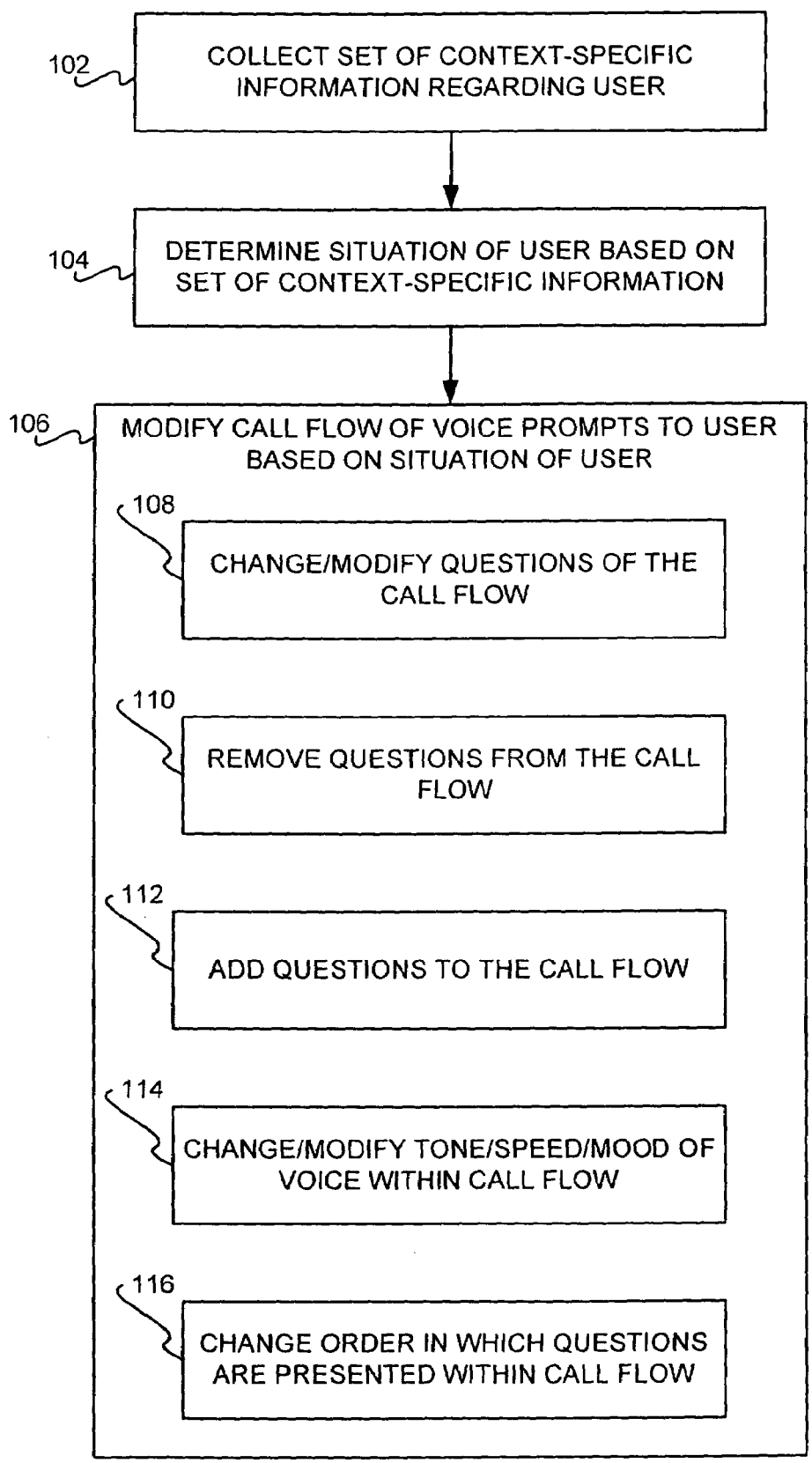
FIG. 1 is a flowchart of a method for modifying a call flow of voice prompts to a user, according to one embodiment of the invention, and is suggested for printing on the first page of the patent.

FIG. 1 shows a method 100, according to an embodiment of the invention. The method 100 is performed in relation to a system with which a user initiates a phone call, or a system that initiates a phone call to a user. For instance, the system may be an interactive voice response (IVR) system, in one embodiment of the invention, or another type of system.

The method 100 collects a set of context-specific information regarding the user that has initiated a call to the system or with whom the system has initiated the call (102). Context in this respect means information regarding the user, regarding a computing device that the user may be currently using, and/or the environment in which the user is currently located. Thus, the context-specific information can include, but is not limited to, locational information of the user, weather information at the current location of the user, and traffic information of the user. The context-specific information may further include, but is not limited to, proximity information of the user to a given transportation mode, such as an airport or a train station, as well as user preferences information.

Other types of context-specific information can include personalization information, time information, and behavior history of the user. Still other types of context-specific information include, in relation to finance-oriented systems, changes in the financial market and current stock prices. Context-specific information may also include changes to the user's environment, as well as the user's mood, such as being relaxed, tense, and so on. Other types of context-specific information may also be collected by embodiments of the invention.

The method 100 then determines a situation of the user based on this set of context-specific information collected (104). The situation of the user may be defined as the combination of circumstances of the user at a current moment in time. Thus, the situation of the user is just that, the situation that the user is currently in. The situation of the user may be considered an abstraction of the set of context-specific information that has been collected. That is, whereas the set of context-specific information includes particular data points of the user's current context, the situation of the user is an abstraction of these particular data points, such that the user's current context can be easily described.

Finally, the method 100 modifies the call flow of voice prompts to the user within the call with the system, based on the situation of the user as has been determined (106). That is, a call between the system and the user is sequenced by a particular call flow of voice prompts that the system presents to the user, to either provide information to the user, or to solicit responses from the user. As has been described in the background, the call flow is substantially preordained within the prior art, and is modified only insofar as there are conditional flows based on the user's answers or responses to the voice prompts. By comparison, embodiments of the invention modify this call flow of voice prompts to the user based on the situation of the user as has been described. The call flow may be represented as a graph, such as a directed acyclic graph (DAG) in one embodiment of the invention.

For instance, questions represented by voice prompts within the call flow may be changed or modified based on the situation of the user (108). For example, if the current situation of the user has been determined as the user having a scheduled flight that has been delayed, a question of "why are you calling today" may instead be changed to "would you like information regarding the changes to your scheduled flight." Questions represented by voice prompts within the call flow may further be removed from the call flow (110), or added to the call flow (112) based on the Situation of the user. For example, if the current situation of the user has been determined as the user being in a rushed situation, a question asking "would you like to have long voice prompts or short voice prompts" may be removed, and instead short voice prompts may be presented to the user automatically. As another example, if the current situation of the user has been determined as the current financial markets having suffered a major loss in value, a question asking "would you like to hear information regarding the major drop in today's financial markets" may be added to the call flow.

Furthermore, the tone, speed, and/or mood of the voice presenting the voice prompts within the call with the user may be changed or modified based on the situation of the user (114). If it is determined that the user is in a rush, the tone, speed, and/or mood of the voice presenting the voice prompts may be correspondingly modified, for instance, so that the user feels that the system is responding with the same urgency that the user has. By comparison, if it is determined that the user is calling when he or she has a lot of time available, the tone, speed, and/or mood of the voice presenting the voice prompts may be correspondingly modified, for instance, so that the voice speaks in a more conversational tone, at a more conversational speed, and with a more conversational mood, to again mirror the user's own current situation.

As a final example, the order in which questions are presented to the user within the call with the user may be modified based on the situation of the user (116). For example, it may be determined that the user is calling from his or her car, and that he or she is currently in a traffic jam. The normal order of questions may be to ask the user whether he or she wishes to hear the current weather, followed by asking the user whether he or she wishes to hear the current traffic conditions. However, based on the user's current situation, the order of these two questions may be reversed, so that the user is first asked whether he or she wishes to hear the current traffic conditions.

Figure 2:
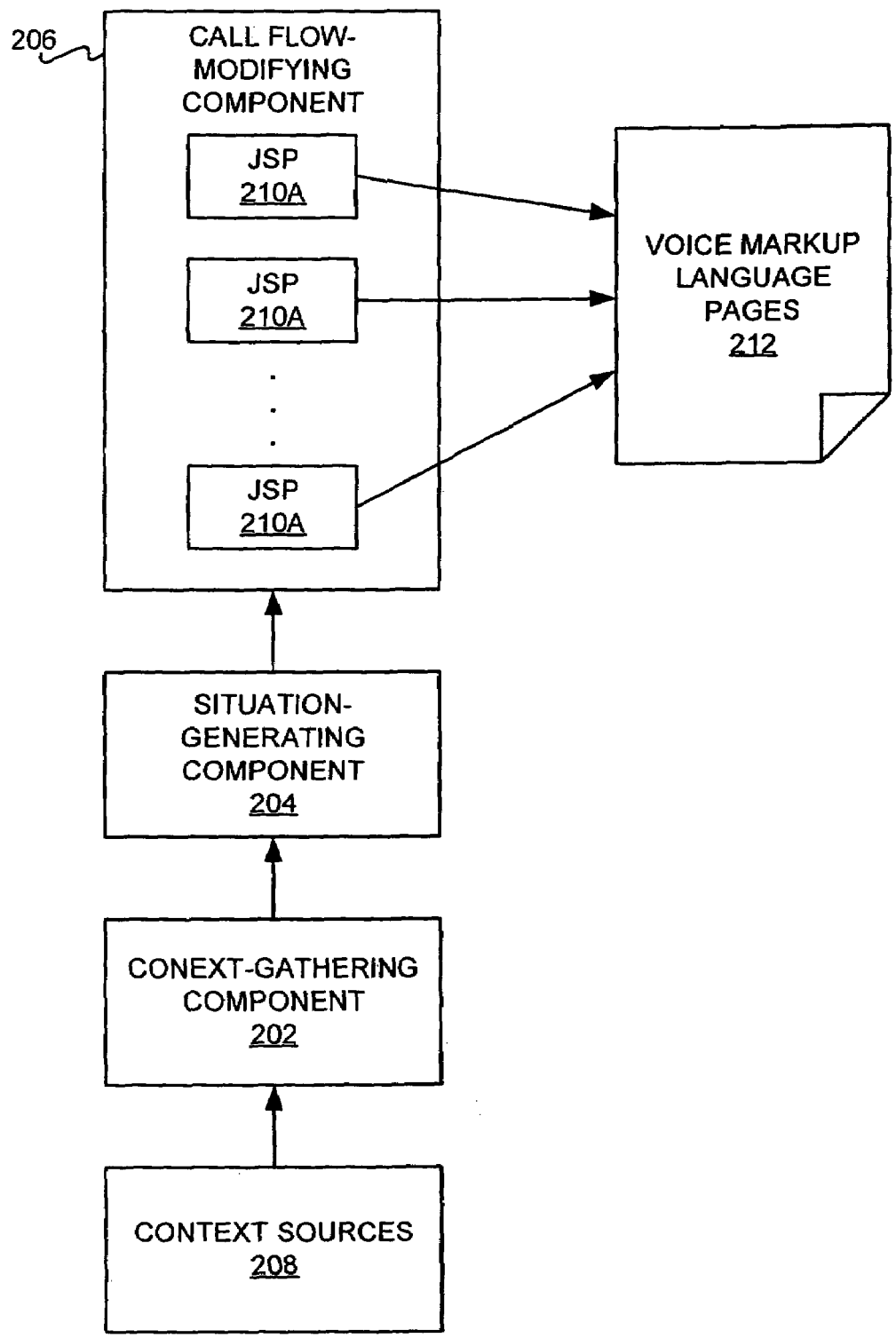
FIG. 2 is a diagram of a computing system for modifying a call flow of voice prompts to a user, according to one embodiment of the invention.

FIG. 2 shows a computing system 200 that can implement the method 100 for modifying the call flow of a call between a user and the system 200, according to an embodiment of the invention. The computing system 200 is depicted as including a context-gathering component 202, a situation-generating component 204, and a call flow-modifying component 206, as well as context sources 208. The components 202, 204, and 206 may each be implemented in software, hardware, or a combination of hardware and software. Furthermore, the computing system 200 may include other components and mechanisms, in addition to and/or in lieu of those depicted in FIG. 2.

The context-gathering component 202 collects the set of context-specific information regarding the user, without prompting the user for this information within a call between the system 200 and the user. In particular, the component 202 composes such contexts from various context sources 208 that are input into the component 202. For instance, the component 202 may have knowledge regarding the user with whom a call has been or will be initiated. The component 202 may know the location from which the user has called, using caller ID technology. The component 202 may receive this information from one of the context sources 208, and then feed this information to other of the context sources 208 to obtain further contextual information, such as the weather at 10 this location, the time at this location, and so on. The component 202 is thus depicted in FIG. 2 as being a discrete component, so that the system 200 can be easily extended to include other types of context-specific information regarding the user by simply defining new context sources 208 from which the system 200 is able to receive information.

The context-gathering component 202 provides the set of context-specific information regarding the user to the situation-generating component 204. The situation-generating component 204 in turn determines the situation of the user as a single situation from a set of possible situations, based on the set of context-specific information, where the situation is descriptive of the context-specific information as a whole. For instance, in the embodiment of FIG. 2, the situation may be selected from a rudimentary set of possible situations, "standard service" or "quick service." In the former situation, it is determined that the user requires standard service within the call, whereas in the latter situation, it is determined that the user requires quick service within the call. Thus, the set of context-specific information in this example is abstracted to one of two possible situations, where the situation that is ultimately determined adequately describes the context-specific information of the user as a whole. The latter situation, "quick service" may be determined where the user is calling from an accident-prone location near the side of a road, if the user is identified as being a premium customer, if the user is just about to miss an airplane flight, and so on.

The situation-generating component 204 provides the situation of the user to the call flow-modifying component 206. The call flow-modifying component 206 modifies the call flow of voice prompts to the user within the call to the system 200 based on the situation of the user. In the embodiment of FIG. 2, the call flow-modifying component 206 is made up of a number of Java® Server Pages (JSP's) 210A, 210B, . . . , 210N, and which are collectively referred to as JSP's 210. A JSP is an extension to Java® servlet technology from Sun that allows markup language pages, such as voice markup language pages like Voice eXtended Markup Language (VoiceXML) pages, to be dynamically modified by combining the markup language pages with executable code written in the Java® programming language. The Java® code provides the processing to modify the basic content of the markup language pages presented within the JSP's 210.

Therefore, in the embodiment of FIG. 2, the JSP's 210 are written to provide a basic framework of voice markup language pages, such as VoiceXML pages, that encapsulate the call flow of voice prompts within the call with the user, and to modify this basic framework based on the situation of the user as provided by the situation-generating component 204. At runtime, when the JSP's 210 receive the situation of the user, the actual voice markup language pages 212 representing the call flow as modified per the user's situation are generated by the JSP's 210. In other words, the voice markup language pages 212 are not generated until the user's situation has been determined. As a result, the call flow of voice prompts within the call with the user is generated as predicated on the user's situation, such that it can be said that the call flow is modified based on the user's situation.

Stated another way, the JSP's 210 of the call flow-modifying component 206 generate the voice markup language pages 212 at runtime, after the situation-generating component 204 has determined the situation of the user and has provided it to the JSP's 210. Therefore, the system 200 of FIG. 2 communicates with the user based on the situation of the user. The utilization of the JSP's 210 in this embodiment ensures that the context of the user is captured, and is abstracted to a situation, such that the call flow of voice prompts within the call to the user is modified. The voice markup language pages 212 encapsulate, or represent, this call flow, and because they are dynamically generated after the situation of the user has been determined, the call flow is dependent on the situation of the user, and thus is modified based on the situation of the user.

Figure 3:
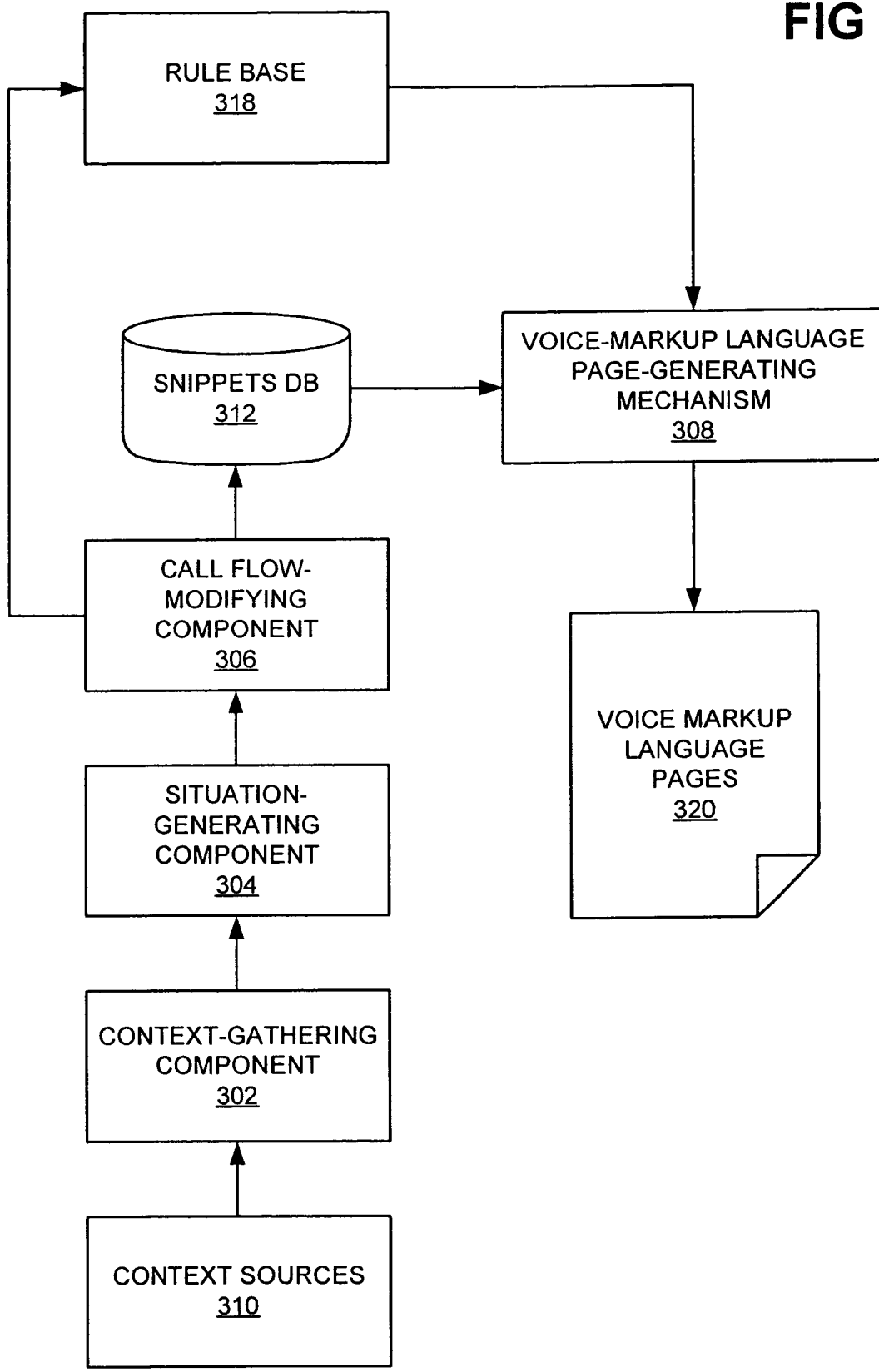
FIG. 3 is a diagram of a computing system for modifying a call flow of voice prompts to a user, according to another embodiment of the invention.

FIG. 3 shows a computing system 300 that can implement the method 100 for modifying the call flow of a call between a user and the system 300, according to another embodiment of the invention. The computing system 300 is depicted as including a context-gathering component 302, a situation-generating component 304, a call flow-modifying component 306, and a voice markup language page-generating mechanism 308, as well as context sources 310, a dialog snippets database 312, and a rule base 318. The components 302, 304, and 306, as well as the component 308, may each be implemented in software, hardware, or a combination of hardware and software. Furthermore, the computing system 300 may include other components and mechanisms, in addition to and/or in lieu of those depicted in FIG. 3.

The context-gathering component 302 collects the set of context-specific information regarding the user, without prompting the user for this information within a call between the system 300 and the user. In particular, the component 302 composes such contexts from various context sources 310 that are input into the component 302. The component 302 is depicted in FIG. 3 as being a discrete component, so that the system 300 can be easily extended to include other types of context-specific information regarding the user by simply defining new context sources 310 from which the system 300 is able to receive information.

The context-gathering component 302 provides the set of context-specific information regarding the user to the situation-generating component 304. The situation-generating component 304 in turn determines the situation of the user as a set (i.e., or sequence) of situational events, based on the set of context-specific information. The situational events are each an abstraction of one or more of the context-specific information provided by the component 302. For instance, the context-specific information may include the current temperature of the user's location is over 100 F, the current location of user in a car in a traffic jam, and the current time at the user's location is 5 PM. Therefore, two situational events may be generated: one situational event that the user is in hot weather conditions, and the other that the user is in rush-hour traffic. The first situational event is an abstraction of the contextual information that the current temperature at the user's location is over 100 F. The second situational event is an abstraction of the contextual information that the user is in a car in a traffic ham, and of the contextual information that the current time at the user's location is 5 PM.

Therefore, the set of situational events determined as the situation of the user in the embodiment of FIG. 3 differs from the single situation of the user determined in the embodiment of FIG. 2 in that it is potentially more descriptive and more rich. For instance, in the embodiment of FIG. 2, a single descriptor is provided as the user's current situation, whereas in the embodiment of FIG. 3, a set of descriptors may be provided as the user's current situation. In both these embodiments, the user's situation is still an abstraction of the set of context-specific information that has been collected. However, in the embodiment of FIG. 2, the set of context-specific information is abstracted to a single descriptor, whereas in the embodiment of FIG. 3, different portions of the context-specific information can be abstracted to different descriptors.

The situation-generating component 304 provides the set of situational events to the call flow-modifying component 206. The call flow-modifying component 206 modifies the call flow of voice prompts to the user within the call to the system 300 based on the situation of the user. In particular, the call flow-modifying component 206 generates a set of dialog snippets for the call flow, and determines the order in which the dialog snippets are presented to the user within the call flow and/or the conditions regarding the presentation of each dialog snippet based on context-sensitive logic.

The dialog snippets are each a portion of the call flow, and thus may include one or more voice prompts of the call flow itself. For each situational event, a dialog snippet may be generated by the call flow-modifying component 306, by using logic for the component 306 that maps voice prompts to situational events, for instance. Furthermore, the dialog snippets may be presented to the user in an order based on which situational events are presented in the set of situational events of the situation of the user. Such ordering may be accomplished based on context-sensitive logic for the component 306. Similarly, whether a given dialog snippet is in actuality presented to the user may be determined based on the context-sensitive logic for the component 306, in that the logic may provide conditions denoting when a given dialog snippet is presented.

The context-sensitive logic that the call flow-modifying component 306 uses to generate the dialog snippets, as well as to determine the order and conditionality of the dialog snippets, may be contained within a rule base 318, which is a database that stores logical rules. The rules within the rule base 318 is separate from the call flow-modifying component 306, so that the component 306 can be easily extended without modification to the component 306 itself by modifying the logic stored within the rule base 318. Furthermore, the call flow-modifying component 306 stores the dialog snippets that it generates within a snippets database 312.

Unlike the call flow-modifying component 206 of the embodiment of FIG. 2, then, the call flow-modifying component 306 of the embodiment of FIG. 3 does not generate the actual voice markup language pages that encapsulate the call flow. Rather, the component 306 just generates dialog snippets that represent portions of the voice prompts within the call flow. In this sense, therefore, the component 306 still modifies the call flow based on the situation of the user. However, the embodiment of FIG. 3 is more easily extended as compared to the embodiment of FIG. 2. In the embodiment of FIG. 2, the voice prompts themselves of the call flow are hard coded into the JSP's 210, and thus the JSP's 210 themselves have be recoded in order to modify the voice prompts. By comparison, in the embodiment of FIG. 3, the voice prompts themselves of the call flow are generated by virtue of generation of the dialog snippets. Therefore, the logic governing the generation of the dialog snippets, as stored in the rule base 318, can simply be modified by modifying the rule base 318, in order to easily modify the voice prompts. That is, no code reprogramming is required in the embodiment of FIG. 3.

The voice markup language page-generating mechanism 308 then generates the actual voice markup language pages, such as VoiceXML pages, that encapsulate the actual call flow. The mechanism 308, uses the dialog snippets from the snippets database 312, as stored in the database 312 by the call flow-modifying component 306, to dynamically assemble voice markup language pages in accordance with the order and conditionality of the snippets that the component 306 stored within the rule base 318. For instance, the order and conditionality of the snippets may dictate that a given snippet first be presented to the user. Therefore, the mechanism 308 retrieves that snippet from the database 312, dynamically generates a voice markup language page for that snippet, which is then presented to the user. Based on the answers that the user provides to the prompts of this dialog snippet, the mechanism 308 may then retrieve another dialog snippet from the database 312, dynamically generate a voice markup language page for that snipped, and present it to the user.

Therefore, the voice markup language page generation is divorced from the call flow modification in the embodiment of FIG. 3, as compared to the embodiment of FIG. 2. Based on logic present within the rule base 318, the call flow modifying-component 306 generates dialog snippets and stores them in the snippets database 312, and details the order and conditionality of their presentment to the user within the rule base 318 itself. The voice markup language page-generating mechanism 308 then uses the order and conditionality as stored in the rule base 318 by the component 306 to retrieve dialog snippets on the fly from the snippets database 312, and dynamically generate voice markup language pages for these dialog snippets. Thus, the voice markup language pages are not generated all at once, but rather on an as-needed basis, in the embodiment of FIG. 3.

Figure 4:
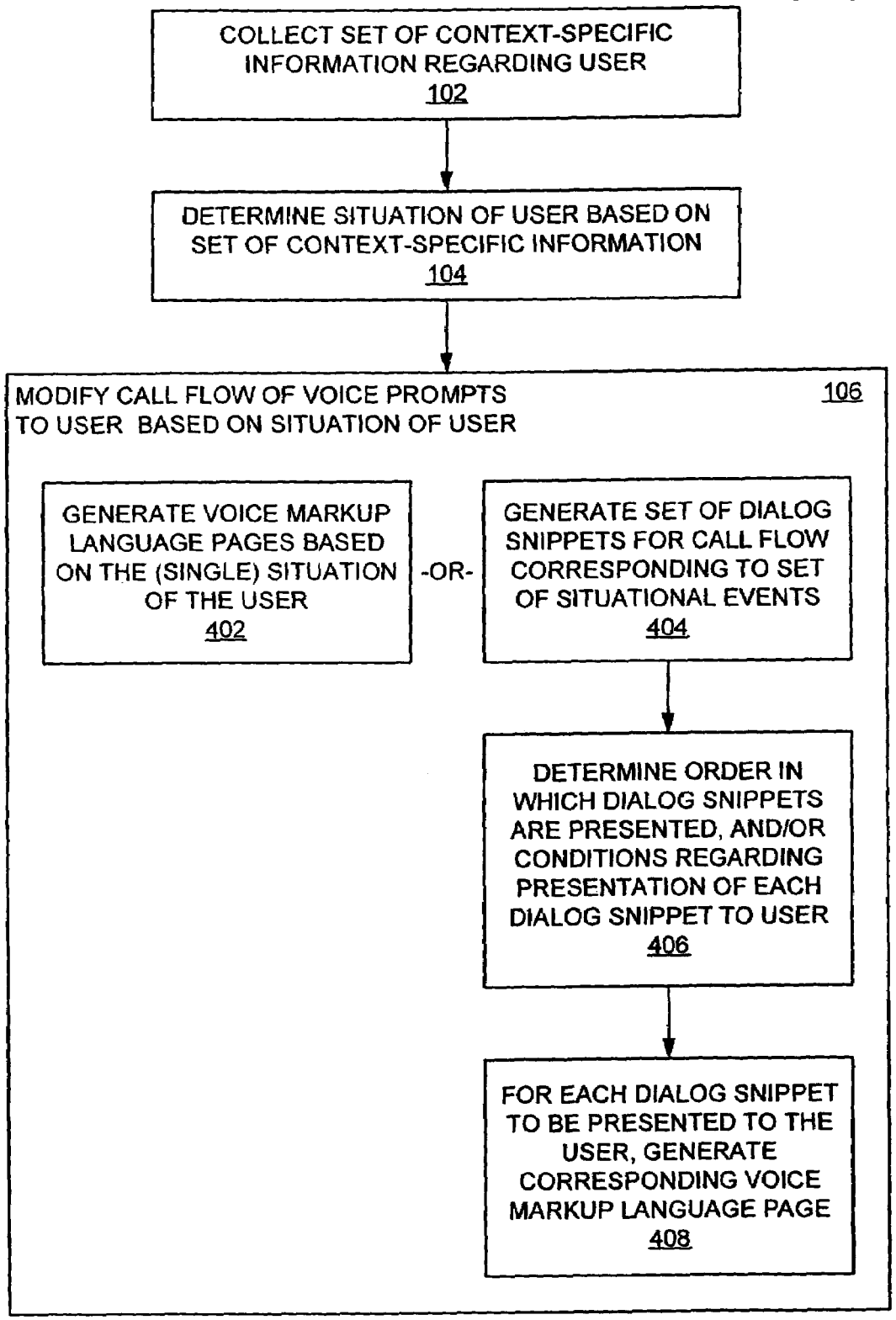
FIG. 4 is a flowchart of a method for modifying a call flow of voice prompts to a user that is more detailed than but consistent with the method of FIG. 1, according to an embodiment of the invention.

FIG. 4 shows a method 400, according to an embodiment of the invention. The method 400 is consistent with, but more detailed than, the method 100 of FIG. 1 that has been described. As before, a set of context-specific information regarding the user that has initiated a call to the system or with whom the system has initiated the call is collected (102). The context-specific information may be collected by the context-gathering component 202 of the system 200 of FIG. 2, or by the context-gathering component 302 of the system 300 of FIG. 3, for instance.

A situation of the user based on this set of context-specific information is then determined (104). For instance, in the embodiment of FIG. 2, the situation-generating component 204 may generate a single situation that is an abstraction of the set of context-specific information as a whole, and which adequately describes the set of context-specific information as a whole. As another example, in the embodiment of FIG. 3, the situation-generating component 304 may generate a set, or a sequence, of situational events as the situation, where each situational event is an abstraction of one or more of the context-specific information that has been collected.

Finally, the call flow of voice prompts to the user is modified based on the situation of the user as has been determined (106). In the embodiment of FIG. 2, the voice-markup language pages are generated by the call flow-modifying component 206 (specifically by the JSP's 210 thereof), based on the single situation of the user as has been determined (402). In the embodiment of FIG. 3, by comparison, first a set of dialog snippets for the call flow are generated, as corresponding to the set of situational events (404), by the call-flow modifying component 306. Next, the order in which the dialog snippets are presented, and/or the conditions regarding the presentation of each dialog snippet to the user, are determined (406), by the call-flow modifying component 306. Then, for each dialog snippet to be presented to the user, a corresponding voice markup language is generated on the fly, as the dialog snippets are to be presented to the user (408), by the voice markup language page-generating mechanism 308.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For instance, the methods that have been described may be implemented by one or more computer programs. The computer programs may be stored on a computer-readable medium, such as a recordable data storage medium, or another type of computer-readable medium. Therefore, it is manifestly intended that this invention be limited only by the claims and equivalents thereof.

What is claimed is:

1. A method comprising:
    collecting a set of context-specific information regarding a user initiating a call to a system or said user with whom the system initiates the call without prompting the user within the call;
    determining a situation of the user based on the set of context-specific information collected; and,
    modifying a call flow of voice prompts to the user within the call with the system based on the situation of the user determined.

2. The method of claim 1, wherein said collecting the set of context-specific information regarding the user comprises collecting at least one of:
    locational information regarding the user;
    weather information at a current location of the user;
    traffic information at the current location of the user;
    proximity information of the user to a transportation mode;
    user preferences information;
    relevant changes in stock quotes;
    relevant new stock offerings;
    any change in an environment of the user that should act as a stimulus to which to react or adjust;
    behavior history of the user;
    personalization information regarding the user;
    time information regarding the user;
    environment changes;
    user location-based state;
    financial market changes; and,
    user mood.

3. The method of claim 1, wherein said determining the situation of the user based on the set of context-specific information collected comprises determining the situation as a single situation from a set of possible situations, such that the situation is descriptive of the set of context-specific information as a whole.

4. The method of claim 3, wherein said modifying the call flow of voice prompts to the user within the call with the system based on the situation of the user determined comprises generating a plurality of voice markup language pages based on the situation of the user determined, the voice markup language pages encapsulating the call flow as modified.

5. The method of claim 1, wherein said determining the situation of the user based on the set of context-specific information collected comprises determining the situation as a set of situational events corresponding to the set of context-specific information.

6. The method of claim 5, wherein said modifying the call flow of voice prompts to the user within the call with the system based on the situation of the user determined comprises:
    generating a set of dialog snippets for the call flow and corresponding to the set of situational events; and,
    determining an order in which the set of dialog snippets are presented to the user within the call flow, and/or conditions regarding presentation of each dialog snippet based on context-sensitive logic stored in a rule base.

7. The method of claim 6, wherein said modifying the call flow of voice prompts to the user within the call with the system based on the situation of the user determined further comprises, for each dialog snippet to be presented to the user, generating a corresponding voice markup language page.

8. The method of claim 1, wherein said modifying the call flow of voice prompts to the user within the call with the system based on the situation of the user determined comprises removing one or more questions from the call flow, where answers to the questions are at least implicit within the situation of the user determined.

9. The method of claim 1, wherein said modifying the call flow of voice prompts to the user within the call with the system based on the situation of the user determined comprises changing one or more questions of the call flow, based on the situation of the user determined.

10. The method of claim 1, wherein said modifying the call flow of voice prompts to the user within the call with the system based on the situation of the user determined comprises adding one or more questions to the call flow, based on the situation of the user determined.

11. The method of claim 1, wherein said modifying the call flow of voice prompts to the user within the call with the system based on the situation of the user determined comprises changing an order in which a plurality of questions within the call flow are presented to the user, based on the situation of the user determined.

12. The method of claim 1, wherein said modifying the call flow of voice prompts to the user within the call with the system based on the situation of the user determined comprises changing at least one of tone, speed, and mood of a voice in which one or more questions are presented to the user within the call flow, based on the situation of the user determined.

13. A system comprising:
a context-gathering component to collect a set of context-specific information regarding a user initiating a call to the system or said user with whom the system initiates the call, without prompting the user within the call;
a situation-generating component to determine a situation of the user as a single, situation from a set of possible situations, based on the set of context-specific information, such that the situation is descriptive of the set of context-specific information as a whole; and,
a call flow-modifying component to generate a plurality of voice markup language pages based on the situation of the user determined, the voice markup language pages encapsulating a call flow of voice prompts to the user within the call with the system,
wherein said the call flow is modified by said call flow-modifying component based on the situation of the user determined.

14. The system of claim 13, wherein the set of context-specific information regarding the user comprises at least one of:
locational information regarding the user;
weather information at a current location of the user;
traffic information at the current location of the user;
proximity information of the user to a transportation mode; and,
user preferences information.

15. The system of claim 13, wherein the call flow is modified by said call flow-modifying component based on the situation of the user determined by one or more of:
changing one or more questions of the call flow, based on the situation of the user determined;
adding one or more questions to the call flow, based on the situation of the user determined; and,
removing one or more questions from the call flow, based on the situation of the user determined.

16. The system of claim 13, wherein the call flow is modified by said call flow-modifying component based on the situation of the user determined by at least changing at least one of tone, speed, and mood of a voice in which one or more questions are presented to the user within the call flow, based on the situation of the user determined.

17. A system comprising:
a context-gathering component to collect a set of context-specific information regarding a user initiating a call to the system or said user with whom the system initiates the call, without prompting the user within the call;
a situation-generating component to determine a situation of the user as a set of situational events corresponding to the set of context-specific information;
a call flow-modifying component to generate a set of dialog snippets for a call flow of voice prompts to the user within the call with the system, and to determine an order in which the set of dialog snippets are presented to the user within the call flow and/or conditions regarding presentation of each dialog snippet based on context-sensitive logic; and,
a voice markup language page-generating mechanism to generate a voice markup language page for each dialog snippet presented to the user,
wherein the call flow is modified by said call flow-modifying component based on the situation of the user determined.

18. The system of claim 17, wherein the set of context-specific information regarding the user comprises at least one of:
locational information regarding the user;
weather information at a current location of the user;
traffic information at the current location of the user;
proximity information of the user to a transportation mode; and,
user preferences information.

19. The system of claim 17, wherein the call flow is modified by said call flow-modifying component based on the situation of the user determined by one or more of:
changing one or more questions of the call flow, based on the situation of the user determined;
adding one or more questions to the call flow, based on the situation of the user determined; and,
removing one or more questions from the call flow, based on the situation of the user determined.

20. The system of claim 17, wherein the call flow is modified by said call flow-modifying component based on the situation of the user determined by at least changing at least one of tone, speed, and mood of a voice in which one or more questions are presented to the user within the call flow, based on the situation of the user determined.

* * * * *

UNITED STATES PATENT AND TRADEMARK OFFICE
CERTIFICATE OF CORRECTION

PATENT NO. : 7,627,476 B2 Page 1 of 1
APPLICATION NO. : 11/303431
DATED : December 1, 2009
INVENTOR(S) : Nanavati et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Second Day of November, 2010

David J. Kappos
*Director of the United States Patent and Trademark Office*